United States Patent Office.

FREDERICK BECK, OF NEW YORK, N. Y.

Letters Patent No. 107,997, dated October 4, 1870; reissue No. 4,181, dated November 22, 1870.

IMPROVEMENT IN COMPOUNDS FOR COLORING AND ORNAMENTING PAPER AND OTHER FABRICS AND MATERIALS.

The Schedule referred to in these Letters Patent and making part of the same.

*To all whom it may concern:*

Be it known that I, FREDERICK BECK, of the city, county, and State of New York, have invented a new and improved Coloring Compound; and I hereby declare the following to be a full, clear, and exact description thereof, which will enable those skilled in the art to make and use the same.

This invention relates to a compound, which is intended principally for coloring wall-paper, fancy-paper, cloth, and other fabrics, and which is made of mica, reduced to fine scales and combined with transparent or translucent adhesive substances to such a consistency that it can be used for coloring and printing paper, cloth, and other fabrics in the same manner as other coloring compounds now employed for that purpose, and where suppleness is a requisite I combine glycerine with my compound.

In carrying out my invention I take mica and reduce it to fine scales by grinding, rubbing, or by any other suitable means. The mica should be crushed, rubbed, or ground, but not reduced to dust, as that would impair its luster. The particles of mica should have flat surfaces, so as to give the luster or gloss peculiar to the substance.

A suitable size is such as would pass through a sieve of one hundred meshes to the inch.

This finely-reduced mica I combine with starch, glue, gum, or other suitable transparent or translucent adhesive substance, in such quantities that the mass has the proper consistency to be applied to paper, cloth, and other fabrics or materials, and when it is desirable, I combine glycerine with the mass, for the purpose of imparting suppleness.

The mode of making up compounds for coating and printing being well known to the manufacturers of paper-hangings and window-shades, therefore need not be further described.

By combining mica scales with transparent or translucent adhesive substances, a compound is formed, which, when applied to paper, cloth, or other material, produces a silvery gloss of a beautiful effect. It can be applied on a white or a tinted ground, and, when applied to the latter, the tinted ground shows through my coloring compound, and a most striking effect is produced.

My compound has the great advantage that it is not liable to become dull, or turn yellow, but will retain its luster and white appearance for a long time.

Having thus described my invention,

What I claim as new, and desire to secure by Letters Patent, is—

1. The compound herein described, consisting of disintegrated mica combined with transparent or translucent adhesive substances, substantially as herein set forth.

2. The combination of mica scales, transparent or translucent adhesive substances, and glycerine, so as to produce a coating for paper, cloth, and other fabrics, substantially as described.

Witnesses:

J. H. LANGE,

H. M. JOHNSTON.

FRED. BECK.